US008209332B2

(12) United States Patent
Andrus et al.

(10) Patent No.: US 8,209,332 B2
(45) Date of Patent: Jun. 26, 2012

(54) METHOD AND APPARATUS FOR PREFERRED ROAMING LIST COMPRESSION

(75) Inventors: Don Nielsen Andrus, Encinitas, CA (US); Roy Franklin Quick, Jr., San Diego, CA (US); Ramin Rezaiifar, San Diego, CA (US); Paul E. Bender, San Diego, CA (US); Rotem Cooper, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1203 days.

(21) Appl. No.: 11/586,030

(22) Filed: Oct. 24, 2006

(65) Prior Publication Data
US 2007/0038613 A1 Feb. 15, 2007

Related U.S. Application Data

(63) Continuation of application No. 11/009,281, filed on Dec. 9, 2004, now Pat. No. 7,127,447, which is a continuation of application No. 10/011,961, filed on Nov. 5, 2001, now Pat. No. 6,901,395.

(51) Int. Cl.
*G06F 17/30* (2006.01)
(52) U.S. Cl. ......... 707/736; 707/757; 709/247; 370/389
(58) Field of Classification Search .......... 707/736–757; 370/381, 389, 392
See application file for complete search history.

(56) References Cited

U.S. PATENT DOCUMENTS

| 6,067,574 A | 5/2000 | Tzeng |
| 6,070,187 A * | 5/2000 | Subramaniam et al. ...... 709/220 |
| 6,192,051 B1 | 2/2001 | Lipman et al. |
| 6,208,649 B1 | 3/2001 | Kloth |
| 6,292,838 B1 * | 9/2001 | Nelson ........................ 709/236 |
| 6,304,912 B1 | 10/2001 | Oguchi et al. |
| 6,377,982 B1 * | 4/2002 | Rai et al. ..................... 709/217 |
| 6,414,950 B1 * | 7/2002 | Rai et al. ..................... 370/338 |
| 6,421,714 B1 * | 7/2002 | Rai et al. ..................... 709/217 |
| 6,532,217 B1 | 3/2003 | Alkhatib et al. |
| 6,535,642 B1 | 3/2003 | De Bonet |
| 6,570,875 B1 | 5/2003 | Hegde |
| 6,697,354 B1 * | 2/2004 | Borella et al. ................ 370/352 |
| 6,775,369 B1 * | 8/2004 | McClung ................ 379/211.04 |
| 6,839,794 B1 * | 1/2005 | Schober ....................... 710/316 |
| 6,970,459 B1 * | 11/2005 | Meier ........................ 370/389 |
| 7,072,337 B1 * | 7/2006 | Arutyunov et al. .......... 370/389 |
| 7,254,615 B2 * | 8/2007 | Taib et al. .................... 709/209 |
| 7,360,245 B1 * | 4/2008 | Ramachandran et al. ...... 726/13 |
| 2001/0036161 A1 | 11/2001 | Eidenschink et al. |
| 2002/0026525 A1 | 2/2002 | Armitage |
| 2002/0089958 A1 * | 7/2002 | Feder et al. .................. 370/338 |
| 2002/0197991 A1 * | 12/2002 | Anvekar et al. .............. 455/432 |
| 2003/0035409 A1 * | 2/2003 | Wang et al. .................. 370/349 |
| 2004/0198350 A1 * | 10/2004 | Aerrabotu ................ 455/432.1 |
| 2004/0204136 A1 * | 10/2004 | Uchida ........................ 455/566 |

OTHER PUBLICATIONS

Degermark M. et al. "Small forwarding tables for fast routing look-ups" Proceedings of the ACM SIGCOMM, Sep. 1997, pp. 3-14.

* cited by examiner

*Primary Examiner* — Hanh Thai
(74) *Attorney, Agent, or Firm* — Philip Wadsworth; Kristine U. Ekwueme

(57) ABSTRACT

Techniques for efficient storage and retrieval of Preferred Roaming Lists are disclosed. In one aspect, PRL entries are stored in two tables. One table contains records that are common to two or more PRL entries. Another table stores any information that is unique to a PRL entry, as well as an indicator of which common record is associated with it. The common record is concatenated with the unique information to generate the uncompressed PRL entry. Various other aspects of the invention are also presented. These aspects have the benefit of reducing the memory requirements for storing a PRL. In addition, time required to download the compressed PRL is reduced.

29 Claims, 8 Drawing Sheets

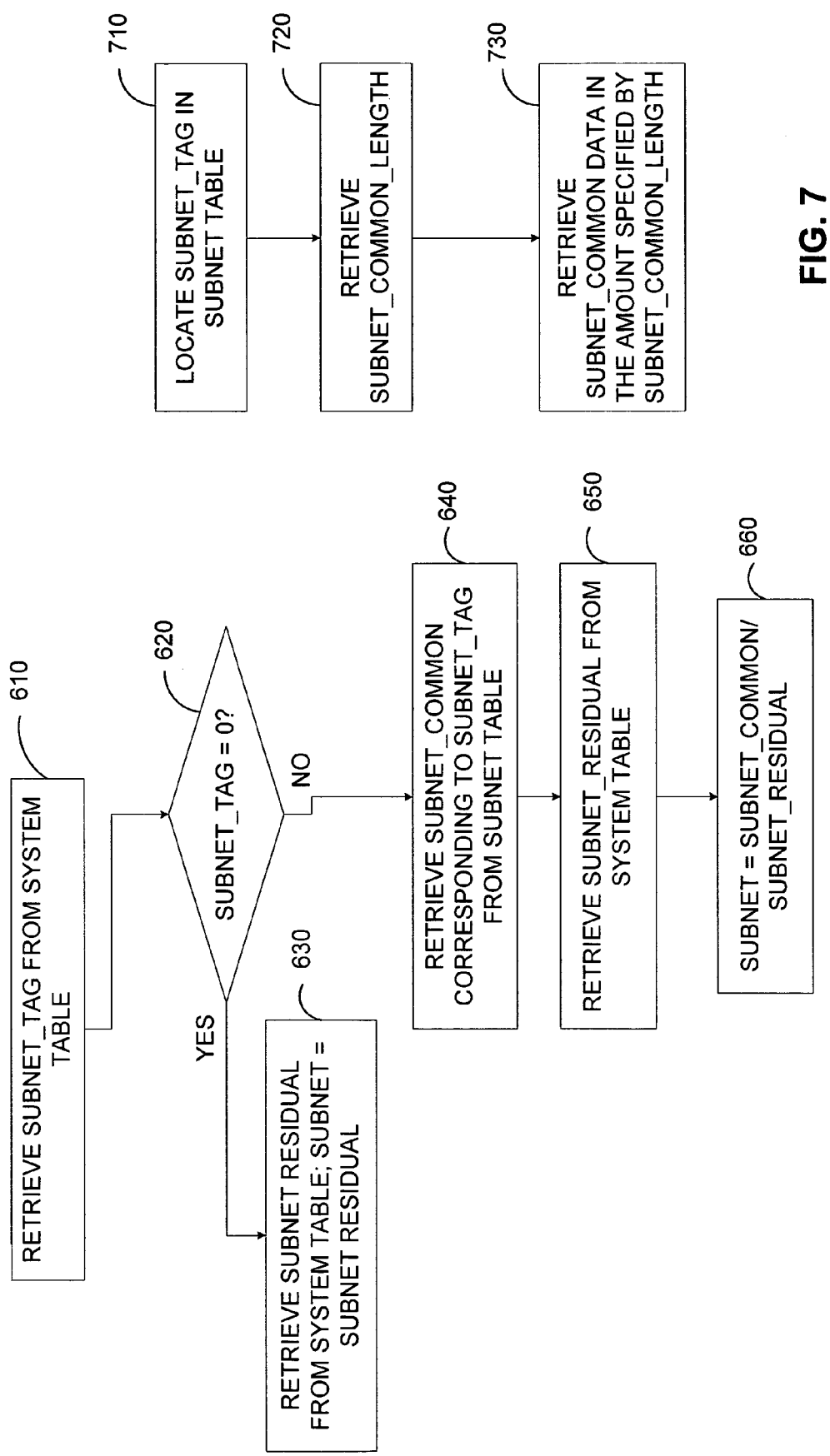

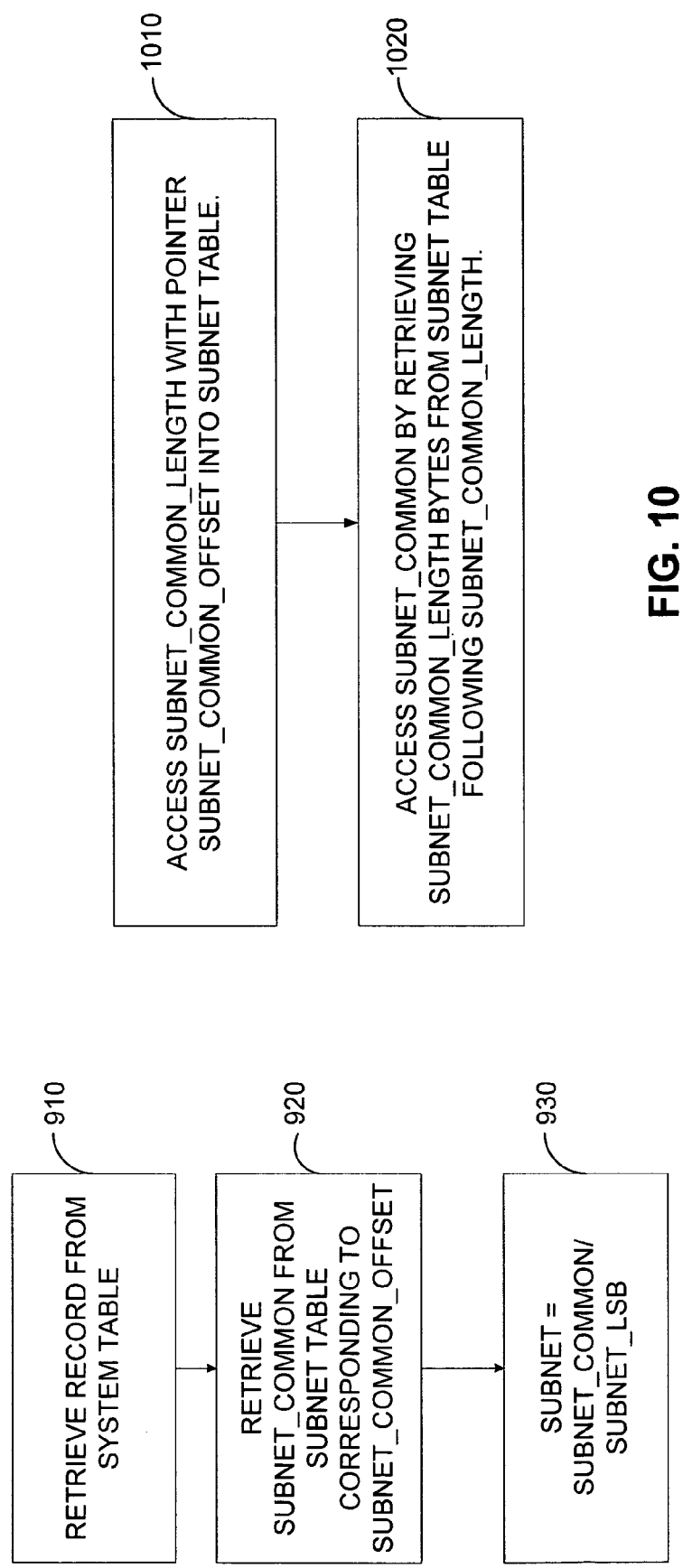

METHOD AND APPARATUS FOR PREFERRED ROAMING LIST COMPRESSION

CLAIM OF PRIORITY UNDER 35 U.S.C. §120

The present Application for Patent is a Continuation and claims priority to patent application Ser. No. 11/009,281 entitled "METHOD AND APPARATUS FOR PREFERRED ROAMING LIST COMPRESSION" filed Dec. 9, 2004 now U.S. Pat. No. 7,127,447, now allowed which is a continuation application of application Ser. No. 10/011,961, filed Nov. 5, 2001, now U.S. Pat. No. 6,901,395 entitled "METHOD AND APPARATUS FOR PREFERRED ROAMING LIST COMPRESSION" issued May 31, 2005, and assigned to the assignee hereof and hereby expressly incorporated by reference herein.

FIELD

The present invention relates generally to communications, and more specifically to a novel and improved method and apparatus for Preferred Roaming List (PRL) compression.

BACKGROUND

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), (4) the "TIA/EIA-IS-856 CDMA2000 High Rate Packet Data Air Interface Specification" (the IS-856 standard), and (5) some other standards.

Cellular communication system users commonly have a service agreement with a cellular provider. The system operated by a cellular provider may cover a limited geographical area. When a user travels outside of this geographical area, service may be provided by another system operator, under a roaming agreement. There is often more than one service provider in a particular region, so a user may have a choice as to which service provider to roam with. As cellular communication systems have proliferated, networks of cellular systems have been organized under common service providers, or with contractual agreements between service providers. Roaming fees are minimized or eliminated when a user transfers between systems which are party to such agreements. As such, modern mobile stations often make use of Preferred Roaming Lists (PRLs), which contain information about the preferred systems for roaming and various parameters needed for communication therewith. PRLs may be pre-programmed in a mobile station when service is initiated. Alternatively, PRLs can be programmed with over-the-air data transfers. Such programming is described in "TIA/EIA-683-B Over-the-Air Service Provisioning of Mobile Stations in Spread Spectrum Systems", a standard compatible with the above named wireless communication systems.

The list of sectors in a typical PRL can be quite large, and will likely grow larger as more mobile stations are equipped for international roaming. Furthermore, in data communication systems, such as the HDR standard, each sector is assigned an IPv6 (Internet Protocol version 6) address which is 128 bits in length. As the length of the PRL increases, and as the information in each record in the PRL expands, the memory requirements to store the PRL will grow accordingly. Furthermore, over-the-air updates to the PRL will take longer as the PRL size expands. There is therefore a need in the art for efficient storage and retrieval of Preferred Roaming Lists.

SUMMARY

Embodiments disclosed herein address the need for efficient storage and retrieval of Preferred Roaming Lists (PRL). In one aspect, PRL entries are stored in two tables. One table contains records that are common to two or more PRL entries. Another table stores any information that is unique to a PRL entry, as well as an indicator of which common record is associated with it. The common record is concatenated with the unique information to generate the uncompressed PRL entry. Various other aspects of the invention are also presented. These aspects have the benefit of reducing the memory requirements for storing a PRL. In addition, time required to download the compressed PRL is reduced.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 6 depicts an embodiment of a method for accessing the compressed PRL of FIG. 5;

FIG. 7 depicts a procedure for retrieving common information from a subnet table;

FIG. 9 depicts an embodiment of a method for accessing the compressed PRL of FIG. 8;

FIG. 10 depicts an alternate procedure for retrieving common information from a subnet table.

DETAILED DESCRIPTION

Figure 1:
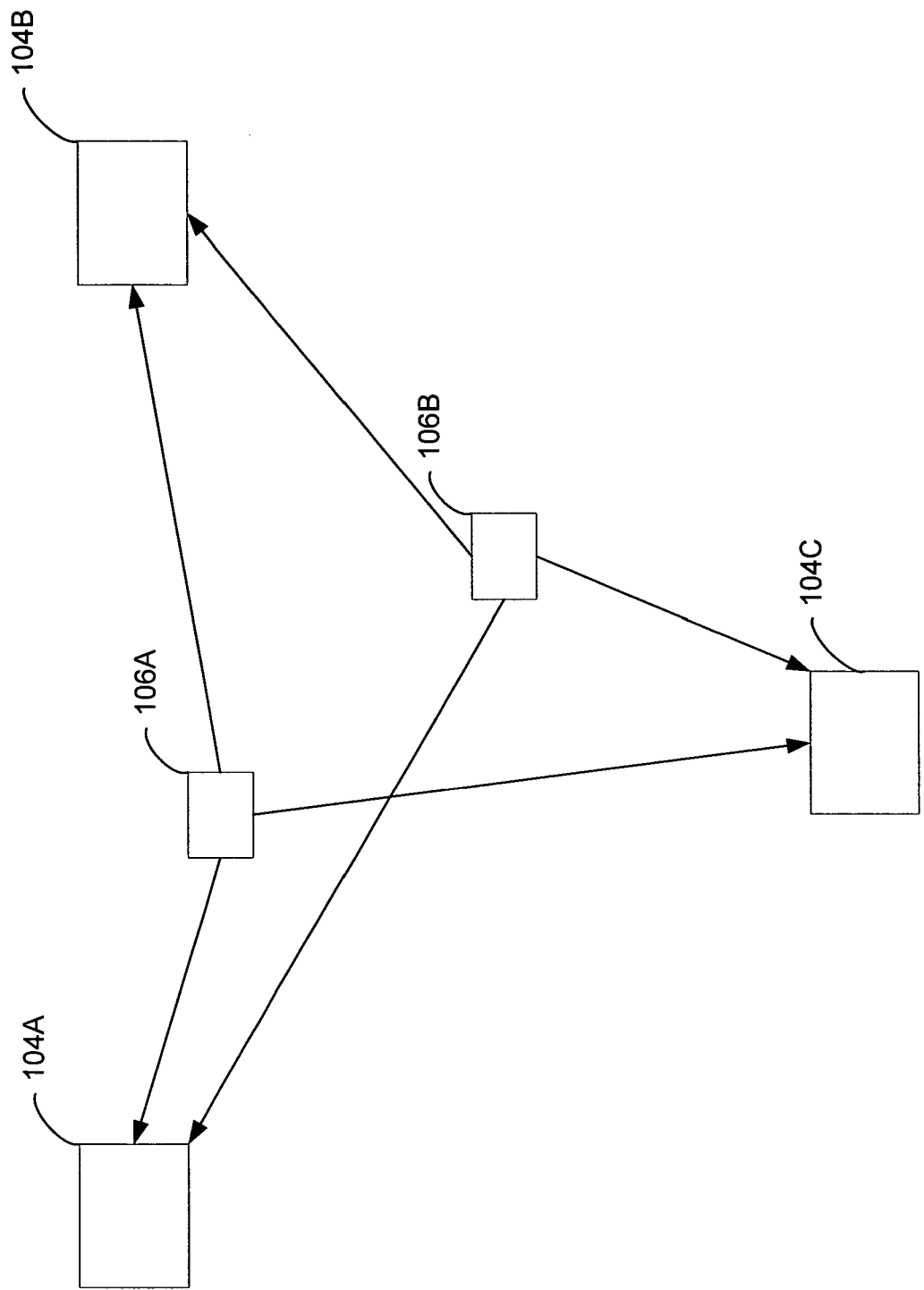
FIG. 1 is a general block diagram of a wireless communication system capable of supporting a number of users.

FIG. 1 is a diagram of a wireless communication system 100 according to one embodiment that supports a number of users, and which can implement various aspects of the invention. System 100 may be designed to support one or more CDMA standards and/or designs (e.g., the W-CDMA standard, the IS-95 standard, the cdma2000 standard, the IS-856 standard). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the term access point. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station. The word "exemplary" is used exclusively herein to mean "serving as an example, instance, or illustration." Any embodiment described herein as "exemplary" is not necessarily to be construed as preferred or advantageous over other embodiments.

Figure 2:
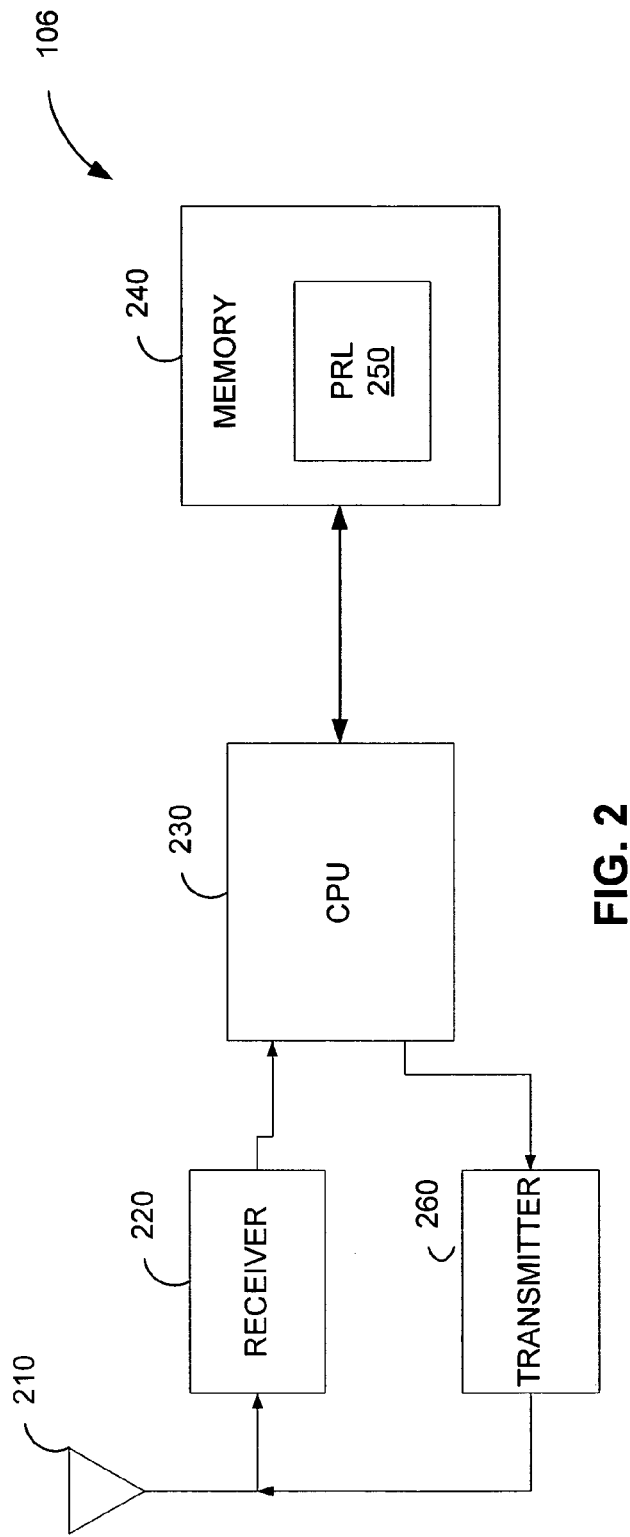
FIG. 2 depicts a mobile unit configured in accordance with an embodiment of the present invention.

FIG. 2 shows an embodiment of mobile unit 106. For clarity, only a subset of the components is shown. Signals are received at antenna 210, and delivered to receiver 220 where amplification, down-conversion, sampling, and demodulating takes place. Various techniques for receiving CDMA signals are known in the art. In addition, the principles of the present invention apply with equal force to wireless communication systems deploying air interfaces other than those based on CDMA. Receiver 220 is in communication with a central processing unit (CPU) 230. CPU 230 may be a microprocessor or digital signal processor (DSP), or one of various processors known in the art. CPU 230 communicates with memory 240, which is shown containing PRL 250. PRL 250 can be programmed via over-the-air programming in conjunction with antenna 210 and receiver 220, or the data for the PRL can come in from other inputs to CPU 230, labeled "alternate input" in FIG. 2. CPU 230 is also connected to transmitter 260, for transmitting messages, data, voice, etc., using any of the techniques for transmission known in the art. Transmitter 260 is connected to antenna 210, for transmission to a base station, such as base station 104. Receiver 220 and transmitter 260, in conjunction with antenna 210, can be used to communicate with one or more systems identified in PRL 250 when the mobile station is roaming.

In an IS-856 system, each sector has a unique IPv6 address, which is 128 bits in length. In some instances, a network operator may deploy numerous sectors within a system. The IP addresses of these sectors may differ only slightly (i.e., in the least significant bits) since a large portion of each sector address identifies the carrier. In addition, various parameters associated with each of these sectors may be common among the sectors due to their collocation within the network, such as frequency, PN offset, and the like. As used herein, the term subnet refers to an entry in the PRL associated with a group of sectors. The principles of the present invention apply to the concept of a subnet as defined for Internet Protocol (IP) addresses. However, these principles apply more generally to compression of a PRL regardless of the exact nature of the information stored in each record of the PRL. As such, the term subnet, as used herein, should be construed to refer to any of the myriad possibilities of PRL records.

Figure 3:
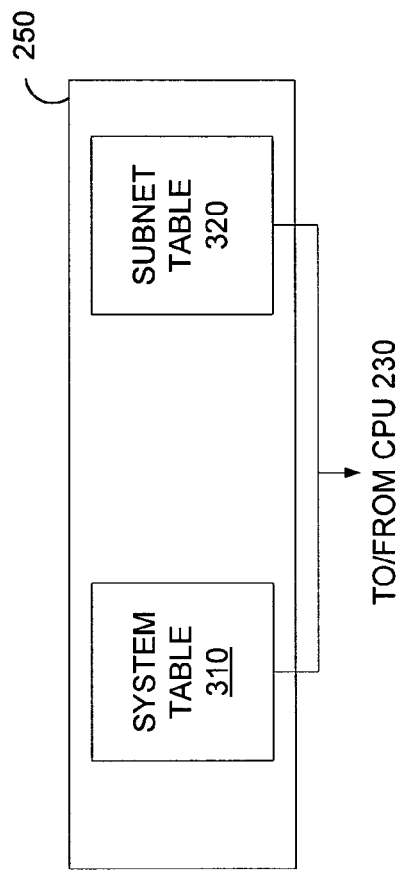
FIG. 3 depicts a compressed PRL.

FIG. 3 depicts an embodiment of PRL 250. Recall that PRL 250 is contained in memory 240. PRL 250 contains two tables, system table 310 and subnet table 320. System table 310 contains entries corresponding to each record of the PRL. In each system table 310 entry, information unique to that entry will be stored, along with an indicator for accessing corresponding data in subnet table 320. Subnet table 320 contains records which are shared in common with one or more entries in system table 310. Thus, rather than including duplicate copies of information in various entries of system table 310, one common copy is stored in subnet table 320, and an indicator for accessing that common copy will be stored in each corresponding entry in system table 310.

Figure 4:
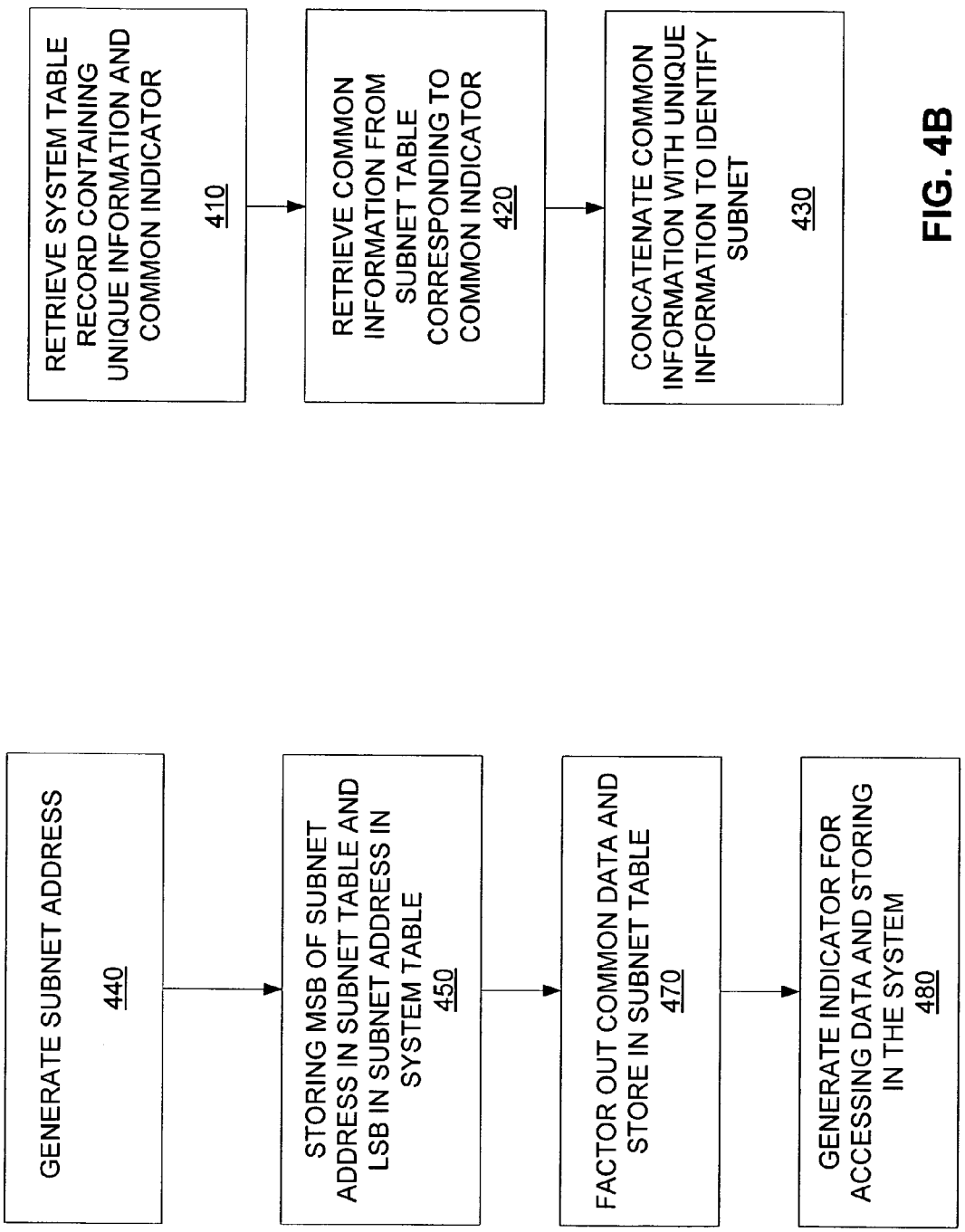
FIG. 4A illustrates a process for generating a compressed PRL.
FIG. 4B illustrates a method for accessing a subnet from a compressed PRL.
Figure 11:
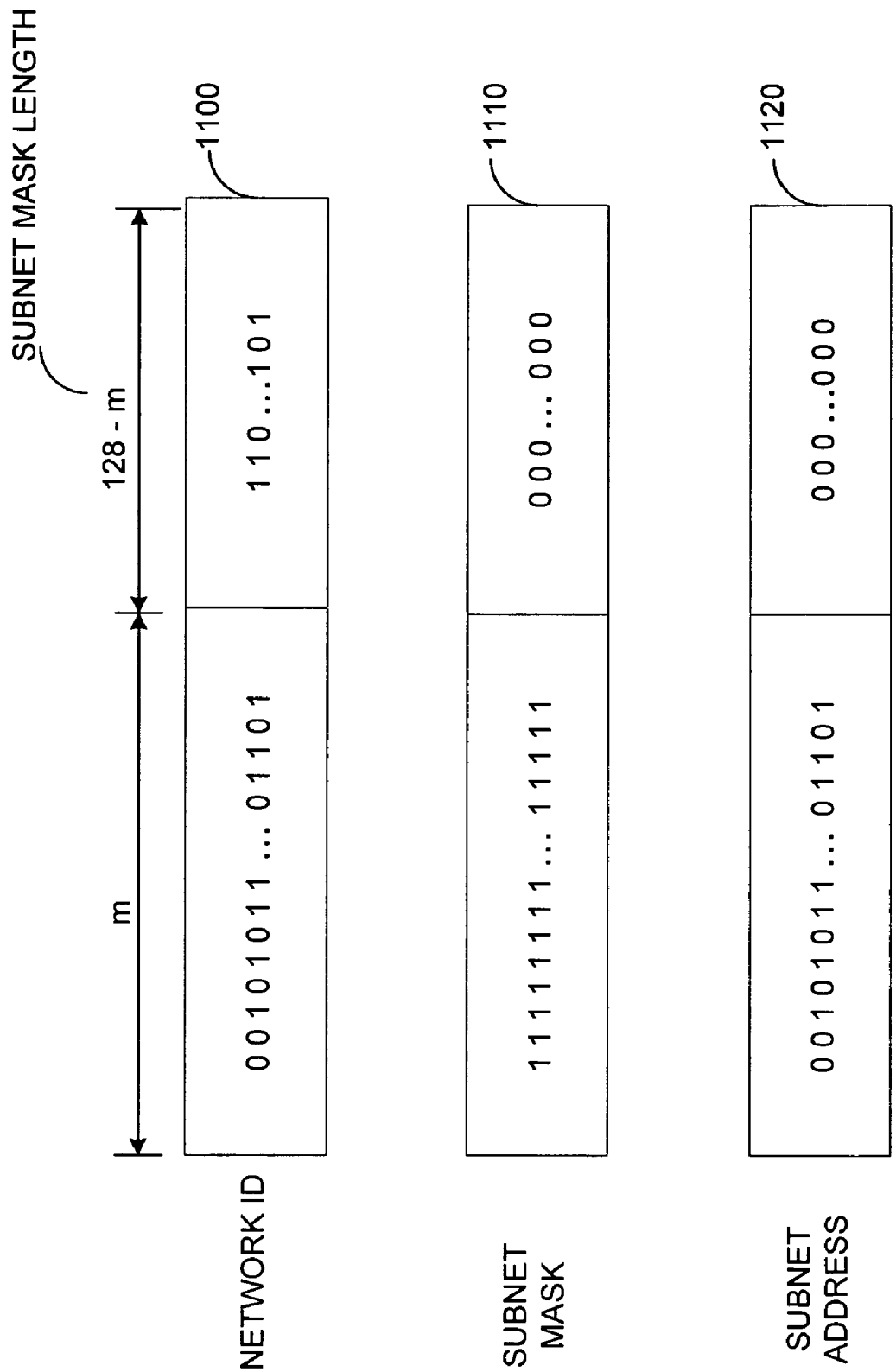
FIG. 11 depicts an exemplary network ID, subnet mask, subnet address, and their inter-relationship.

Consider the following example as illustrated in FIG. 4A. The proposed IS-856 system record comprises, among other fields, a network ID and a subnet mask length, m. In an exemplary embodiment, PRL 250 comprises a plurality of these system records. The network ID is a 128-bit value. A subnet mask can be formed using a subnet mask length m by concatenating m ones with 128-m zeros. FIG. 11 depicts this example. When network ID 1100 is bit-wise ANDed with subnet mask 1110, subnet address 1120 (FIG. 4A, 440) is the result. All the sectors within a subnet will share a common subnet address, and will be distinguished using the 128-m least significant bits. The size of the subnet is limited by the number of bits assigned to distinguish the sectors within it. Performing the operation shown in FIG. 11 on the network ID, included in the system record, for all sectors in a subnet will yield an identical result for each subnet address. So, the subnet identifies a group of sectors. It is expected that the most significant k bits of the subnets associated with a particular wireless operator is to be the same. Therefore, the upper k bits of the subnet address can be stored once in subnet table 320, and the lower 128-k bits can be stored for each record in the system table 310. Note that m is the length of the subnet (FIG. 4A, 450), whereas k is the length of the common part of the subnet that is to be factored out.

System table 310 and subnet table 320 will be detailed more fully below in the descriptions of various embodiments deploying them. Note that these tables, and the PRL, are shown as discrete entities for clarity only. While, in an alternative embodiment, each table could be housed in a discrete memory, a more common embodiment will have system table 310 and subnet table 320, which make up PRL 250, as a subspace of a common memory element 240.

FIG. 4B depicts an embodiment of a method for accessing a PRL, such as PRL 250. In step 410, a record from the system table 310 is retrieved, which corresponds to an entry in the PRL 250. The record will contain any information that is unique to the entry, as well as an indicator of common information, if any. A variety of techniques for indexing, storing, and accessing the common information can be employed, examples of which are detailed in embodiments described below. In step 420, a common portion of the subnet is retrieved from a subnet table 320, if there is a common portion corresponding to the record. In step 430, the common portion is concatenated with the unique portion to form the complete subnet record.

The creation of a system table 310 and a subnet table 320 from a PRL can be accomplished by reversing the steps depicted in FIG. 4B. The details of partitioning and indexing will depend on the procedure chosen, examples of which are detailed below. The resultant system table 310 and subnet table 320 form a compressed PRL 250. Thus, the time required to transmit the compressed PRL to mobile station 106 is reduced, whether the transmission occurs via a wired connection or is updated over the air, as described in IS-683.

An exemplary embodiment of a method for compressing a PRL comprises the following steps: First, data that is common to two or more subnets is factored out and stored in a subnet table (FIG. 4A, 470). The remaining data, not factored out, is stored in the symbol table, with an indicator for accessing the associated common information in the system table (FIG. 4A, 480). As described in an example above, one convenient way to factor out common information is to look for common characteristics, such as shared subnet address, frequency, and the like.

It may be that, in some cases, a larger common portion can be factored out of a first subset of PRL records, but a smaller common sub-portion of that common portion can be factored out of a second, larger subset of PRL records. One example of this may occur in a system that allows subnets within subnets. In such a system, records corresponding to one subnet within a larger subnet will share a large part of their network address in common. Another set of records, corresponding to a different subnet within the same larger subnet, will similarly share a large part of their network address in common. However, all of the records in both subnets, within the larger subnet, will still have in common the portion of the network address identifying the larger subnet, although the common portion will be smaller than the common portion of their individual subnets.

A variety of techniques for factoring fall within the scope of the present invention. One technique is to apply a multi-pass factoring step, which calculates and compares various compression results (accounting for multiple factoring options), selecting the best compression result. Another technique is to extend the two-table example to allow nested tables. For example, if subnets within subnets are available in the system, then subnet tables can be equipped with indicators to locate common elements within a sub-subnet table. Yet another technique is to store more than one indicator in a record in the system table, each of the indicators identifying a separate entry in the subnet table. Those of skill in the art will recognize how to deploy various combinations of the techniques disclosed herein to accommodate various system configurations.

Figure 5:
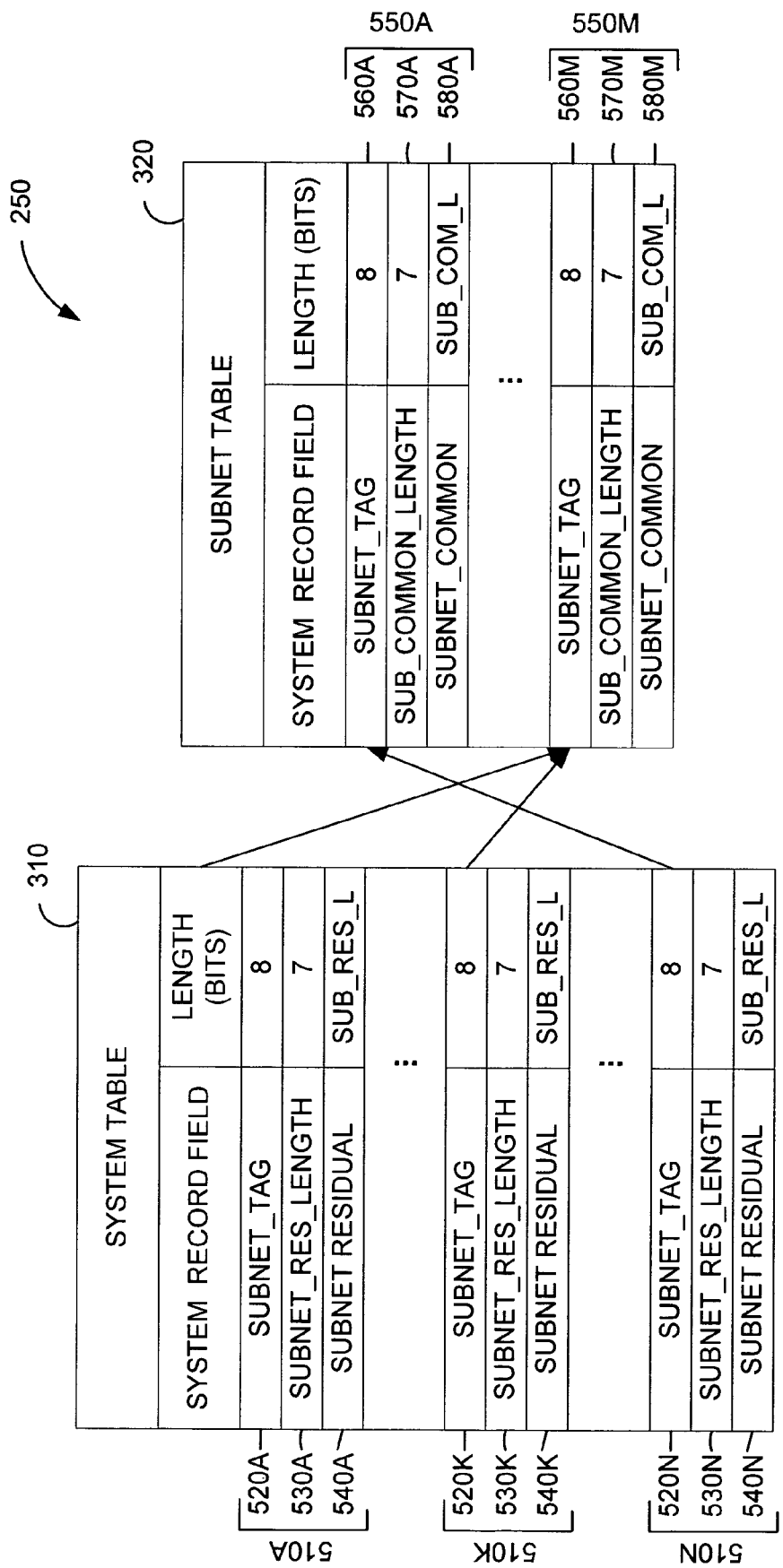
FIG. 5 depicts a detailed embodiment of a compressed PRL.

FIG. 5 depicts an exemplary embodiment of compressed PRL 250. It comprises system table 310 and subnet table 320. Each table contains records identified by a system record field and an associated field length, in bits. System table 310 comprises N records, 510A-510N, corresponding to N entries in the PRL. Subnet table 320 comprises M common records, 550A-550M, which are associated with various of the N system table records, 510A-510N. System table records 510A-510N comprise the fields SUBNET_TAG 520A-520N, SUBNET_RESIDUAL_LENGTH 530A-530N, and SUBNET_RESIDUAL 540A-540N. Subnet table records 550A-550M comprise the fields SUBNET_TAG 560A-560M, SUBNET_COMMON_LENGTH 570A-570M, and SUBNET_COMMON 580A-580M, respectively.

In this embodiment, each SUBNET_TAG 520A-520N and 560A-560M is eight bits in length. A system table SUBNET_TAG 520A-520N corresponds to at most one subnet table SUBNET_TAG 560A-550M. A value of zero in a system table SUBNET_TAG indicates that none of the subnet table records 550A-550M correspond with that system table record. For non-zero values, the system table SUBNET_TAG identifies one subnet table record with the corresponding SUBNET_TAG value.

The arrows shown in FIG. 5 depict exemplary mappings. For example, system table records 510A and 510K both correspond with subnet table record 550M. Thus, SUBNET_TAG 520A, SUBNET_TAG 520K, and SUBNET_TAG 560M are identical. When retrieving the common information for either of system table records 510A or 510K, subnet table record 550M is identified by the SUBNET_TAG value 560M. Then, SUBNET_COMMON_LENGTH 570M, a seven-bit field in this example, identifies the length of the common information, contained in SUBNET_COMMON 580M. The SUBNET_COMMON_LENGTH field 570M may indicate the length of SUBNET_COMMON 580M in any unit of data length—bits or bytes are typically convenient measures. The amount of data contained in SUBNET_COMMON 580M as delineated by SUBNET_COMMON_LENGTH 570M can then be retrieved from subnet table 320 for association with the system table record, in this example 510A or 510K. Similarly, subnet table record 550A is associated with system table record 510N.

In this embodiment, SUBNET_RESIDUAL_LENGTH 530A-530N is a seven-bit field which indicates the length of SUBNET_RESIDUAL 540A-540N. SUBNET_RESIDUAL is the unique information associated with each system table record 510A-510N.

FIG. 6 depicts an exemplary embodiment of a procedure for accessing a PRL 250, such as that shown in FIG. 5. In step 610, retrieve SUBNET_TAG from the system table 310. Proceed to decision block 620 to test if SUBNET_TAG is equal to zero. If it is zero, there is no common element to be retrieved from the subnet table 320. Proceed to step 630, and retrieve SUBNET_RESIDUAL from the system table. The subnet is identified completely by SUBNET_RESIDUAL.

If, in decision block 620, SUBNET_TAG is not equal to zero, proceed to step 640 and retrieve SUBNET_COMMON corresponding to SUBNET_TAG from the subnet table 320. Proceed to step 650 and retrieve SUBNET_RESIDUAL from system table 310. Proceed to step 660. Concatenate SUBNET_COMMON with SUBNET_RESIDUAL to identify the subnet.

FIG. 7 is a more detailed embodiment of step 640. In step 710, locate SUBNET_TAG in subnet table 320. In step 720, retrieve SUBNET_COMMON_LENGTH to determine how much common data to retrieve. Proceed to step 730 to retrieve the amount of data, from subnet table 320, as specified in SUBNET_COMMON_LENGTH.

Figure 8:
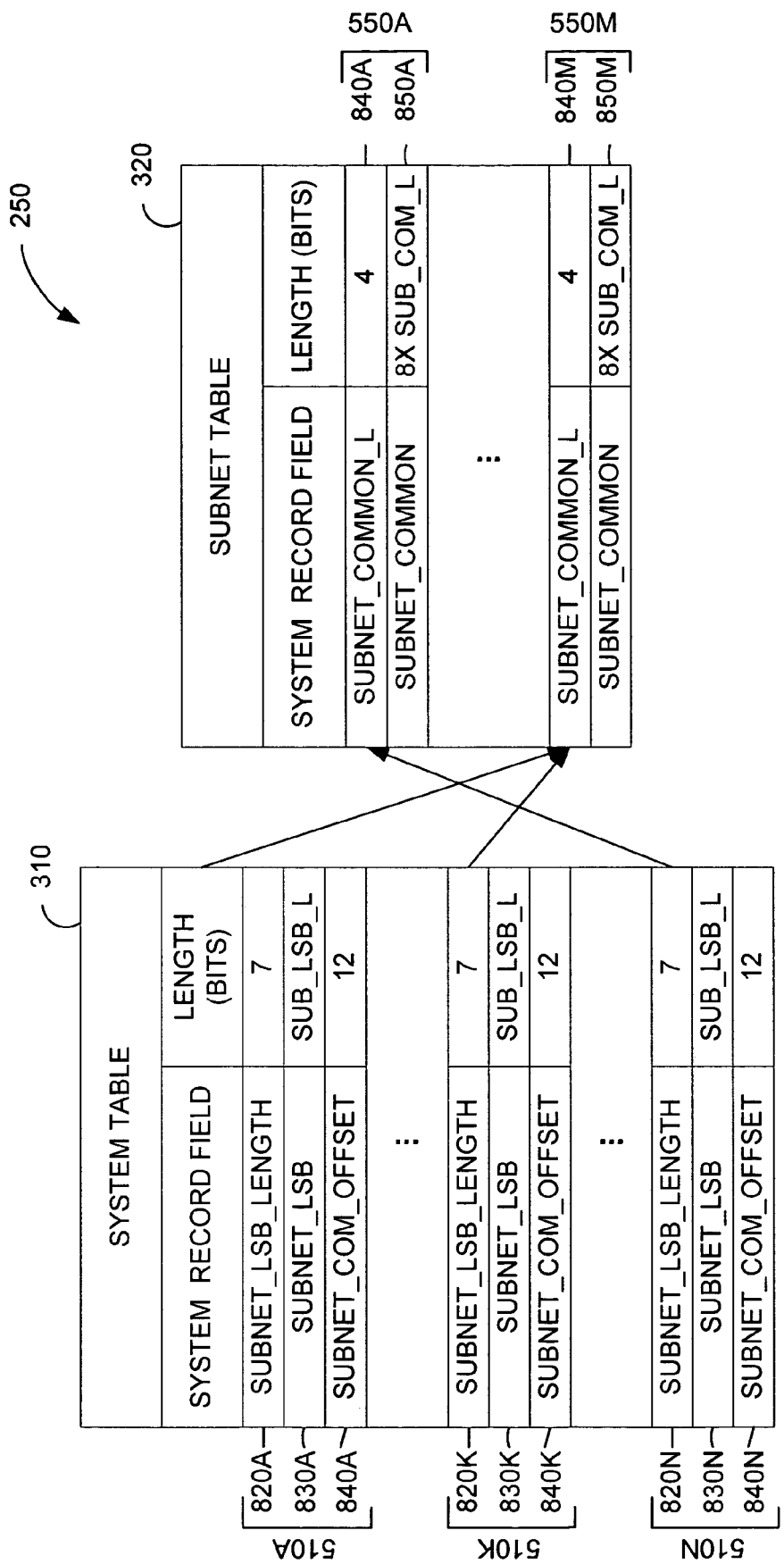
FIG. 8 depicts an alternate detailed embodiment of a compressed PRL.

FIG. 8 depicts another exemplary embodiment of compressed PRL 250. This embodiment uses an index into the subnet table instead of a subnet tag. It also comprises a system table 310 and a subnet table 320. As before, each table contains records identified by a system record field and an associated field length, in bits. System table 310 comprises N records, 510A-510N, corresponding to N entries in the PRL. Subnet table 320 comprises M common records, 550A-550M, which are associated with various of the N system table records, 510-510N. However, in this alternative embodiment, system table records 510A-510N comprise the fields SUBNET_LSB_LENGTH 820A-820N, SUBNET_LSB 830A-830N, and SUBNET_COMMON_OFF- SET 840A-840N. Subnet table records 550A-550M comprise the fields SUBNET_COMMON_LENGTH 840A-840M, and SUBNET_COMMON 850A-850M. In contrast to the embodiment of FIG. 5, note that SUBNET_TAG is not a field in either system table 310 or subnet table 320.

In this embodiment, SUBNET_LSB_LENGTH 810A-810N performs substantially the same function as SUBNET_RESIDUAL_LENGTH 530A-530N. It is a seven-bit field which indicates the length of SUBNET_LSB 820A-820N, a field which performs substantially the same function as SUBNET_RESIDUAL 540A-540N. SUBNET_LSB is the unique information associated with each system table record 510A-510N.

In this embodiment, each SUBNET_COMMON_OFFSET 840A-840N is an index into subnet table 320, the index in this example is 12 bits in length. Each SUBNET_COMMON_OFFSET 830A-830N corresponds to at most one subnet table record 550A-550M. A value of zero in a SUBNET_COMMON_OFFSET indicates that none of the subnet table records 550A-550M corresponds with that system table record.

The arrows shown in FIG. 8 depict exemplary mappings. For example, system table records 510A and 510K both correspond with subnet table record 550M. Thus, SUBNET_COMMON_OFFSET 830A and 830N are identical, and point to subnet table record 550M. Then, SUBNET_COMMON_LENGTH 840M, a four-bit field in this example, identifies the length, in bytes, of the common information, contained in SUBNET_COMMON 850M. The amount of data contained in SUBNET_COMMON 850M as delineated by SUBNET_COMMON_LENGTH 840M can then be retrieved from subnet table 320 for association with the system table record, in this example 510A or 510K. Similarly, subnet table record 550A is associated with system table record 510N.

FIG. 9 depicts an exemplary embodiment of a procedure for accessing a PRL 250, such as that shown in FIG. 8. In step 910, retrieve a record from system table 310. Proceed to step 920 to retrieve the SUBNET_COMMON from the subnet table corresponding to SUBNET_COMMON_OFFSET contained in the system table record. A SUBNET_COMMON_OFFSET of zero means that no common information is to be retrieved. Proceed to step 930, concatenate SUBNET_COMMON with SUBNET_LSB to identify the subnet.

FIG. 10 is a more detailed embodiment of step 920. In step 1010, the process accesses SUBNET_COMMON_LENGTH from the subnet table with the pointer SUBNET_COMMON_OFFSET. Proceed to step 1020. In Step 1020, access SUBNET_COMMON by retrieving a number of bytes specified by the value of SUBNET_COMMON_LENGTH.

Another alternative, not shown, is to nest both the subnet table and the system table in one table. In this alternative, the first occurrence of a common record is included in the record with which it is associated. A tag and/or common record length field may be inserted prior to the common record. Subsequent records in the table, which are associated with the common record, can simply include a pointer or tag, depending on the implementation chosen, to indicate the previously stored common record is to be accessed.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of producing a subnet, comprising:
    retrieving a first record from a first table of a compressed Preferred Roaming List (PRL) stored in a wireless communication device, wherein the compressed PRL comprises at least the first table and a second table comprising information for roaming from one system operator to another, the compressed PRL being associated with a group of base station sectors, each of the sectors having a unique Internet Protocol address, the first record comprising residual data not in the second table and an indicator for accessing corresponding common data in the second table, wherein the common data is common to two or more of a plurality of subnets of a non-compressed PRL, wherein the residual data comprises a first portion of the subnet and is unique to the subnet, and wherein at least a portion of at least one of the common data or the residual data is derived from a logical operation on a network identification and a subnet mask;

retrieving a second record from the second table based on the indicator, the second record comprising the common data corresponding to the residual data in the first record, wherein the common data comprises a second portion of the subnet; and concatenating the first record with the second record to produce the subnet, wherein the subnet is associated with the group of base station sectors.

2. The method of claim 1, wherein the indicator is a pointer into the second table.

3. The method of claim 1, wherein the indicator comprises a tag, the tag being included in the second record for location thereof.

4. The method of claim 1, wherein the indicator is assigned a null value to indicate a null second record when no common information is associated with the first record.

5. The method of claim 1, wherein the common data is not included in the first table.

6. The method of claim 1, wherein the logical operation on the network identification and the subnet mask comprises a bitwise AND operation 7. A method of compressing a Preferred Roaming List (PRL), comprising:

factoring out common data from the PRL stored in a wireless communication device, the PRL comprising information for roaming from one system operator to another, the PRL being associated with a group of base station sectors, each of the sectors having a unique Internet Protocol address, the PRL containing a plurality of subnets, the common data being common to two or more of the plurality of subnets of a non-compressed PRL, wherein a subnet comprises one entry in the PRL;

storing the common data in a first table; and storing residual data not factored out of the plurality of subnets in a second table with an indicator for indicating a set of common data in the first table corresponding to the residual data, wherein at least a portion of at least one of the common data or the residual data is derived from a logical operation on a network identification and a subnet mask.

8. The method of claim 7, wherein the factoring comprises:
factoring out a plurality of sets of the common data;
computing a storage requirement for each of the plurality of sets of the common data; and
selecting sets of the plurality of sets of the common data with the lowest storage requirement.

9. The method of claim 7, further comprising:
factoring out sets of common data that are common to two or more of the entries in the first table;
storing the sets of common data in a third table; and
storing an indicator in the first table for indicating a set of data in the third table corresponding therewith.

10. The method of claim 7, further comprising storing a plurality of indicators in a record in the second table, the plurality of indicators for indicating a plurality of entries in the first table associated therewith.

11. The method of claim 7, wherein the common data is not included in the second table.

12. The method of claim 7, wherein the logical operation on the network identification and the subnet mask comprises a bitwise AND operation.

13. An apparatus for producing a subnet, comprising:
means for retrieving a first record from a first table of compressed Preferred Roaming List (PRL) stored in a wireless communication device, wherein the compressed PRL comprises at least the first table and a second table indicating a preferred system for roaming from one system operator to another, the compressed PRL being associated with a group of base station sectors, each of the sectors having a unique Internet Protocol address, the first record comprising residual data not in the second table and an indicator for accessing corresponding common data in the second table, wherein the common data is common to two or more of a plurality of subnets of a non-compressed PRL, wherein the residual data comprises a first portion of the subnet and is unique to the subnet, and wherein at least a portion of at least one of the common data or the residual data is derived from a logical operation on a network identification and a subnet mask;

means for retrieving a second record from the second table based on the indicator, the second record comprising the common data corresponding to the residual data in the first record, wherein the common data comprises a second portion of the subnet; and means for concatenating the first record with the second record to produce the subnet, wherein the subnet is associated with the group of base station sectors.

14. A method of storing a plurality of subnets, comprising:
storing in a first table a plurality of first records, the plurality of first records comprising residual data not in a second table and an indicator for accessing corresponding common data in the second table, wherein the common data is common to two or more of a plurality of subnets of a non-compressed Preferred Roaming List (PRL), the plurality of subnets indicating a preferred system for roaming from one system operator to another, the plurality of subnets being associated with a group of base station sectors, each of the sectors having a unique Internet Protocol address, wherein the residual data comprises a first portion of the subnet and is unique to the subnet, and wherein at least a portion of at least one of the common data or the residual data is derived from a logical operation on a network identification and a subnet mask; and storing in the second table a plurality of second records, each of the second records comprising the common data corresponding to the residual data in a corresponding one of the plurality of first records, wherein the common data comprises a second portion of the subnet.

15. The method of claim 14, further comprising storing in a third table a plurality of sub-records common to two or more of the plurality of records in the first table, each sub-record identified by two or more sub-indicators stored in two or more of the plurality of records in the first table.

16. The method of claim 14, wherein the common data is not included in the first table.

17. The method of claim 14, wherein the logical operation on the network identification and the subnet mask comprises a bitwise AND operation.

18. An apparatus for producing a subnet, comprising:
a memory; and
a digital signal processing device communicatively coupled to the memory, the digital signal processing device configured to:
retrieve a first record from a first table of compressed Preferred Roaming List (PRL) stored in a wireless communication device, wherein the compressed PRL comprises at least the first table and a second table comprising information for roaming from one system operator to another, the compressed PRL being associated with a group of base station sectors, each of the sectors having a unique Internet Protocol address, the first record comprising residual data not in the second table and an indicator for accessing corresponding common data in the second table, wherein the common data is common to two or more of a plurality of subnets of a non-compressed PRL, wherein the residual data comprises a first portion of the subnet and is unique to the subnet, and wherein at least a portion of at least one of the common data or the residual data is derived from a logical operation on a network identification and a subnet mask;
retrieve second record from the second table based on the indicator, the second record comprising the common data corresponding to the residual data in the first record, wherein the common data comprises a second portion of the subnet; and
concatenate the first record with the second record to produce the subnet, wherein the subnet is an entry in the PRL associated with the group of base station sectors.

19. A computer program product for producing a subnet, comprising:
a computer-readable medium comprising:
a first set of codes for causing at least one computer or processor to retrieve a first record from a first table of compressed Preferred Roaming List (PRL) stored in a wireless communication device, wherein the compressed PRL comprises at least the first table and a second table comprising information for roaming from one system operator to another, the compressed PRL being associated with a group base station sectors, each of the sectors having a unique Internet Protocol address, the first record comprising residual data not in the second table and an indicator for accessing corresponding common data in the second table, wherein the common data is common to two or more of a plurality of subnets of a non-compressed PRL, wherein the residual data comprises a first portion of the subnet and is unique to the subnet, and wherein at least a portion of at least one of the common data or the residual data is derived from a logical operation on a network identification and a subnet mask;
a second set of codes for causing the at least one computer or processor to retrieve a second record from the second table based on the indicator, the second record comprising the common data corresponding to the residual data in the first record, wherein the common data comprises a second portion of the subnet; and
a third set of codes for causing the at least one computer or processor to concatenate the first record with the second record to produce the subnet, wherein the subnet is an entry in the PRL associated with the group of base station sectors.

20. An apparatus for compressing a Preferred Roaming List (PRL), comprising:
a memory; and
a processor coupled to the memory and configured to:
factor out common data from the PRL stored in a wireless communication device, the PRL comprising information for roaming from one system operator to another, the PRL being associated with a group of base station sectors, each of the sectors having a unique Internet Protocol address, the PRL containing a plurality of subnets, the common data being common to two or more of the plurality of subnets of a non-compressed PRL, wherein a subnet comprises one entry in the PRL;
store the common data in a first table; and
store residual data not factored out of the plurality of subnets in a second table with an indicator for indicating a set of common data in the first table corresponding to the residual data, wherein at least a portion of at least one of the common data or the residual data is derived from a logical operation on a network identification and a subnet mask.

21. The apparatus of claim 20, wherein the processor is further configured to:
factor out a plurality of sets of the common data;
compute a storage requirement for each of the plurality of sets of the common data; and
select sets of the plurality of sets of the common data with the lowest storage requirement.

22. The apparatus of claim 20, wherein the processor is further configured to:
factor out sets of common data that are common to two or more of the entries in the first table;
store the sets of common data in a third table; and
store an indicator in the first table for indicating a set of data in the third table corresponding therewith.

23. The apparatus of claim 20, wherein the processor is further configured to store a plurality of indicators in a record in the second table, the plurality of indicators for indicating a plurality of entries in the first table associated therewith.

24. An apparatus for compressing a Preferred Roaming List (PRL), comprising:
means for factoring out common data from the PRL stored in a wireless communication device, the PRL comprising information for roaming from one system operator to another, the PRL being associated with a group of base station sectors, each of the sectors having a unique Internet Protocol address, the PRL containing a plurality of subnets, the common data being common to two or more of the plurality of subnets of a non-compressed PRL, wherein a subnet comprises one entry in the PRL;
means for storing the common data in a first table; and
means for storing residual data not factored out of the plurality of subnets in a second table with an indicator for indicating a set of common data in the first table corresponding to the residual data, wherein at least a portion of at least one of the common data or the residual data is derived from a logical operation on a network identification and a subnet mask.

25. A computer program product for compressing a Preferred Roaming List (PRL), comprising:
a computer-readable medium comprising:
a first set of codes for causing at least one computer or processor to factor out common data from the PRL stored in a wireless communication device, the PRL comprising information for roaming from one system operator to another, the PRL being associated with a group of base station sectors, each of the sectors having a unique Internet Protocol address, the PRL containing a plurality of subnets, the common data being common to two or more of the plurality of subnets of a non-compressed PRL, wherein a subnet comprises one entry in the PRL;

a second set of codes for causing the at least one computer or processor to store the common data in a first table; and a third set of codes for causing the at least one computer or processor to store residual data not factored out of the plurality of subnets in a second table with an indicator for indicating a set of common data in the first table corresponding to the residual data, wherein at least a portion of at least one of the common data or the residual data is derived from a logical operation on a network identification and a subnet mask.

26. An apparatus for storing a plurality of subnets, comprising:

a memory; and a processor coupled to the memory and configured to:

store in a first table a plurality of first records, the plurality of first records comprising residual data not in a second table and an indicator for accessing corresponding common data in the second table, wherein the common data is common to two or more of a plurality of subnets of a non-compressed Preferred Roaming List (PRL), the plurality of subnets indicating a preferred system for roaming from one system operator to another, the plurality of subnets being associated with a group of base station sectors, each of the sectors having a unique Internet Protocol address, wherein the residual data comprises a first portion of the subnet and is unique to the subnet, and wherein at least a portion of at least one of the common data or the residual data is derived from a logical operation on a network identification and a subnet mask; and store in the second table a plurality of second records, each of the second records comprising the common data corresponding to the residual data in a corresponding one of the plurality of first records, wherein the common data comprises a second portion of the subnet.

27. The apparatus of claim 26, wherein said processor is further configured to store in a third table a plurality of sub-records common to two or more of the plurality of records in the first table, each sub-record identified by two or more sub-indicators stored in two or more of the plurality of records in the first table.

28. An apparatus for storing a plurality of subnets, comprising:

means for storing in a first table a plurality of first records, the plurality of first records comprising residual data not in a second table and an indicator for accessing corresponding common data in the second table, wherein the common data is common to two or more of a plurality of subnets of a non-compressed Preferred Roaming List (PRL), the plurality of subnets indicating a preferred system for roaming from one system operator to another, the plurality of subnets being associated with a group of base station sectors, each of the sectors having a unique Internet Protocol address, wherein the residual data comprises a first portion of the subnet and is unique to the subnet, and wherein at least a portion of at least one of the common data or the residual data is derived from a logical operation on a network identification and a subnet mask; and means for storing in the second table a plurality of second records, each of the second records comprising the common data corresponding to the residual data in a corresponding one of the plurality of first records, wherein the common data comprises a second portion of the subnet.

29. A computer program product for storing a plurality of subnets, comprising:

a computer-readable medium comprising:

a first set of codes for causing the at least one computer or processor to store in a first table a plurality of first records, the plurality of first records comprising residual data not in a second table and an indicator for accessing corresponding common data in the second table, wherein the common data is common to two or more of a plurality of subnets of a non-compressed Preferred Roaming List (PRL), the plurality of subnets indicating a preferred system for roaming from one system to another, the plurality of subnets being associated with a group of base station sectors, each of the sectors having a unique Internet Protocol address, wherein the residual data comprises a first portion of the subnet and is unique to the subnet, and wherein at least a portion of at least one of the common data or the residual data is derived from a logical operation on a network identification and a subnet mask; and a second set of codes for causing the at least one computer or processor to store in the second table a plurality of second records, each of the second records comprising the common data corresponding to the residual data in a corresponding one of the plurality of first records, wherein the common data comprises a second portion of the subnet.

\* \* \* \* \*